(12) United States Patent
Frey et al.

(10) Patent No.: US 12,586,608 B2
(45) Date of Patent: \*Mar. 24, 2026

(54) GENERATING VIDEOS

(71) Applicant: Google LLC, Mountain View, CA (US)

(72) Inventors: Nathan James Frey, Venice, CA (US); Zheng Sun, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/937,679

(22) Filed: Nov. 5, 2024

(65) Prior Publication Data

US 2025/0061922 A1     Feb. 20, 2025

Related U.S. Application Data

(63) Continuation of application No. 18/420,509, filed on Jan. 23, 2024, now Pat. No. 12,176,006, which is a
(Continued)

(51) Int. Cl.
*G11B 27/031* (2006.01)
*G06T 7/20* (2017.01)
*G06V 20/40* (2022.01)

(52) U.S. Cl.
CPC .............. *G11B 27/031* (2013.01); *G06T 7/20* (2013.01); *G06V 20/41* (2022.01); *G06T 2207/10016* (2013.01)

(58) Field of Classification Search
CPC .......... G11B 27/031; G06V 20/41; G06T 7/20
See application file for complete search history.

(56) References Cited

U.S. PATENT DOCUMENTS

| | | | |
|---|---|---|---|
| 10,218,954 B2 | 2/2019 | Lakhani et al. | |
| 2011/0013883 A1* | 1/2011 | Ando | H04N 9/8042 |
| | | | 386/E9.011 |

(Continued)

FOREIGN PATENT DOCUMENTS

| | | |
|---|---|---|
| CN | 110139158 | 8/2019 |
| CN | 110188719 | 8/2019 |

(Continued)

OTHER PUBLICATIONS

Henriques et al., "High-speed tracking with kernelized correlation filters, " IEEE Transactions on Pattern Analysis and Machine Intelligence, Aug. 2014, 37(3):583-596.
(Continued)

*Primary Examiner* — Mishawn N. Hunter
(74) *Attorney, Agent, or Firm* — Fish & Richardson P.C.

(57) ABSTRACT

Methods, systems, and apparatus, including computer programs encoded on a computer storage medium, for generating videos. In one aspect, a method comprises: receiving: (i) an input video comprising a sequence of video frames, and (ii) data indicating a target object type; processing the input video to generate tracking data that identifies and tracks visual locations of one or more instances of target objects of the target object type in the input video; generating a plurality of sub-videos based on the input video and the tracking data, including: for each sub-video, generating a respective sequence of sub-video frames that are each extracted from a respective video frame of the input video to include a respective instance of a given target object from among the identified target objects of the target object type; and generating an output video that comprises the plurality of sub-videos.

20 Claims, 5 Drawing Sheets

VIDEO GENERATION SYSTEM 100

Related U.S. Application Data continuation of application No. 17/423,623, filed as application No. PCT/US2020/038963 on Jun. 22, 2020, now Pat. No. 11,915,724.

(56) References Cited

U.S. PATENT DOCUMENTS

| | | | |
|---|---|---|---|
| 2015/0104066 A1* | 4/2015 | Shellshear | G06T 7/277 |
| | | | 382/103 |
| 2016/0034956 A1 | 2/2016 | Rejaram et al. | |
| 2016/0372158 A1* | 12/2016 | Bedingfield, Sr. | |
| | | | H04N 7/17318 |
| 2018/0374233 A1* | 12/2018 | Zhou | G06F 18/22 |
| 2019/0130189 A1 | 5/2019 | Zhou et al. | |
| 2019/0130580 A1 | 5/2019 | Chen et al. | |
| 2020/0210768 A1 | 7/2020 | Turkelson et al. | |
| 2020/0272863 A1 | 8/2020 | Lee et al. | |
| 2021/0142068 A1 | 5/2021 | Aliamiri et al. | |
| 2021/0166009 A1 | 6/2021 | Sun et al. | |
| 2021/0192182 A1 | 6/2021 | Huang et al. | |

FOREIGN PATENT DOCUMENTS

| | | |
|---|---|---|
| EP | 3249651 | 11/2017 |
| JP | 2005-094799 | 4/2005 |
| JP | 2019-140526 | 8/2019 |

OTHER PUBLICATIONS

International Preliminary Report on Patentability in International Appln. No. PCT/US2020/038963, mailed on Jan. 5, 2023, 8 pages.

International Search Report and Written Opinion in International Appln. No. PCT/US2020/038963, mailed on Mar. 16, 2021, 14 pages.

Luo et al., "Video Summarization for Object 1-13 Tracking in the Internet of Things", Eighth International Conference on Next Generation Mobile Apps, Services and Technologies, NGMAST 2014, Oxford, United Kingdom, Sep. 10-12, 2014; Sep. 2014, 288-293.

Notice of Allowance in Japanese Appln. No. 2021-544221, mailed on May 22, 2023, 5 pages (with English translation).

Office Action in Chinese Appln. No. 202080011238.8, mailed on Mar. 21, 2024, 14 pages (with English translation).

Office Action in European Appln. No. 20740118.3, mailed on Mar. 22, 2022, 5 pages.

Office Action in European Appln. No. 20740118.3, mailed on Oct. 21, 2022, 10 pages.

Office Action in European Appln. No. 20740118.3, mailed on Sep. 30, 2021, 5 pages.

Office Action in Indian Appln. No. 202127030938, mailed on Feb. 13, 2023, 6 pages (with English translation).

Office Action in Japanese Appln. No. 2021-544221, mailed on Dec. 5, 2022, 10 pages (with English Translation).

Techcrunch.com [online], "YouTube's Bumper Machine offers an automated way to create six-second ads" May 13, 2019, retrieved on Sep. 11, 2024, retrieved from URL <https://techcrunch.com/2019/05/13/youtube-bumper-machine/>, 3 pages.

US.Arvato-Systems.com [online], "Brand Detection and Video Recognition," Feb. 2020, retrieved on Jul. 19, 2021, retrieved from URL<https://us.arvato-systems.com/more/about-arvato-systems/insights-digital-innovations/brand-detection-and-video-recognition>, 4 pages.

Wojke et al., "Simple online and realtime tracking with a deep association metric," 2017 IEEE International Conference on Image Processing, Bejing, China, Sep. 17-20, 2017; Sep. 2017, 3645-3649.

* cited by examiner

VIDEO GENERATION SYSTEM 100

VIDEO TEMPLATE 200

DIGITAL COMPONENT GENERATION SYSTEM 300

500

RECEIVE INPUT VIDEO AND TARGET OBJECT TYPE    502

GENERATE TRACKING DATA FOR TARGET OBJECTS OF THE TARGET OBJECT TYPE IN THE INPUT VIDEO    504

GENERATE SUB-VIDEOS BASED ON THE INPUT VIDEO AND THE TRACKING DATA    506

GENERATE OUTPUT VIDEO BASED ON THE SUB-VIDEOS    508

GENERATING VIDEOS

CROSS-REFERENCE TO RELATED APPLICATION

This patent application is a continuation (and claims the benefit of priority under 35 USC 120) of U.S. patent application Ser. No. 18/420,509, filed Jan. 23, 2024, which is a continuation (and claims the benefit of priority under 35 USC 120) of U.S. patent application Ser. No. 17/423,623, filed Jul. 16, 2021, now U.S. Pat. No. 11,915,724, issued on Feb. 27, 2024, which is a U.S. National Phase Application under 35 U.S.C. § 371 of International Application PCT/US2020/038963, filed on Jun. 22, 2020, all which are incorporated by reference.

BACKGROUND

This specification relates to generating videos.

The Internet facilitates the exchange of information between users across the globe. Content from multiple different providers, including videos, can be integrated into a single electronic document to create a composite document. For example, a portion of the content included in the electronic document may be selected (or specified) by a publisher of the electronic document. A different portion of content (e.g., third party content, including videos) can be provided by a third party (e.g., an entity that is not a publisher of the electronic document), and integrated into the electronic document to form a composite document that includes content from multiple different sources.

SUMMARY

This specification describes a system implemented as computer programs on one or more computers in one or more locations that can process an input video to extract multiple sub-videos from the input video that each show a respective object of a target object type. The system can combine the sub-videos showing the objects of the target object type to generate a "topical" video (e.g., that includes a target object type related to a given topic). The topical video may be integrated into a digital component that is transmitted for presentation with electronic documents at user devices, e.g., in blocks alongside search results or on third party websites.

According to a first aspect there is provided a method performed by one or more data processing apparatus, the method comprising: receiving: (i) an input video comprising a sequence of video frames, and (ii) data indicating a target object type; processing the input video to generate tracking data that identifies and tracks visual locations of one or more instances of target objects of the target object type in the input video; generating a plurality of sub-videos based on the input video and the tracking data, including: for each sub-video, generating a respective sequence of sub-video frames that are each extracted from a respective video frame of the input video to include a respective instance of a given target object from among the identified target objects of the target object type, wherein at least one of the sub-video frames is cropped from a respective video frame of the input video to include less than all content of the respective video frame; and generating an output video that comprises the plurality of sub-videos.

In some implementations, processing the input video to generate the tracking data comprises, for each instance of a target object of the target object type in the input video:

determining, for each of multiple video frames of the input video, a respective bounding box that encloses the instance of the target object in the video frame.

In some implementations, for each sub-video, generating the respective sequence of sub-video frames comprises: cropping the respective bounding box that encloses the instance of the given target object corresponding to the sub-video from each of the multiple video frames of the input video.

In some implementations, for each sub-video, generating the respective sequence of sub-video frames comprises: determining, based on the tracking data, a same bounding box that encloses the instance of the given target object corresponding to the sub-video in each of multiple video frames of the input video; and cropping the same bounding box from each of the multiple video frames of the input video.

In some implementations, a sub-video frame of a first sub-video and a sub-video frame of a second sub-video are each cropped from a same video frame of the input video.

In some implementations, generating the output video that comprises the plurality of sub-videos comprises: assigning each sub-video of the plurality of sub-videos to a respective slot in a video template that defines a format for combining the plurality of sub-videos.

In some implementations, the method further comprises: receiving one or more additional data elements; and assigning each additional data element to a respective slot in the video template.

In some implementations, each additional data element comprises image data, text data, or both.

In some implementations, the output video concurrently shows at least two of the sub-videos of the plurality of sub-videos.

In some implementations, the method further comprises: receiving a request for a digital component; determining that a digital component that includes the output video is responsive to the request; and providing the digital component that includes the output video in response to the request to be presented alongside search results or on a third-party webpage.

In some implementations, receiving data indicating the target object type comprises: receiving data specifying a keyword; and mapping the keyword to the target object type in accordance with a mapping from keywords to a pre-defined set of possible target object types.

According to another aspect, there is provided a system comprising one or more data processing apparatus and one or more storage devices storing instructions that, when executed by the one or more data processing apparatus, cause the one or more data processing apparatus to perform the operations of the method described above.

According to another aspect, there is provided a computer-readable storage medium storing instructions that, when executed by one or more data processing apparatus, cause the one or more data processing apparatus to perform the operations of the method described above.

Particular embodiments of the subject matter described in this specification can be implemented so as to realize one or more of the following advantages.

This specification describes a video generation system that can process an input video to extract multiple sub-videos that each show a respective object of a target object type, and then combine the sub-videos to generate a topical video. The video generation system may combine the sub-videos, e.g., by slotting the sub-videos into a video template where multiple sub-videos may be concurrently shown. The topical video may effectively summarize the content of the input video that relates to the target object type, while potentially having a shorter duration than the input video, occupying less space in a memory than the input video, and/or requiring less bandwidth to transmit over a communications network (e.g., the Internet) than the input video. The topical video may occupy less space in a memory than the input video and/or require less bandwidth to transmit over a communications network than the input video, e.g., because each sub-video frame of each sub-video (e.g., that makes up the topical video) is cropped from a respective video frame of the input video to include less than all of the content of the video frame and/or because each sub-video comprises content from a subset of the video frames of the input video. In other words, each sub-video comprises a spatial and/or temporal subset of the content of the input video. Moreover, this subset of the content is based on generated tracking data that identifies and tracks visual locations of one or more instances of target objects of a target object type in the input video. This provides more efficient generation of videos through filtering content of an input video to identify and select targeted portions of the input video. Instead of the entire input video being transmitted to distributed systems, a topical video comprising a targeted subset of the input video can be generated and transmitted to a particular system. This can reduce the bandwidth required for transmitting content of the input video when requests are received for content included in the input video. Therefore, the video generation system may enable more efficient use of computational resources, e.g., memory, bandwidth, and computing power. Additionally, by summarizing the content of the input video that relates to the target object type by combining the sub-videos, the information about the target object type from the input video can be presented in a more condensed form and without requiring a user to view the entirety of the input video. This reduces the amount of network bandwidth required to present the information about the target object type to users, and also reduces the amount of time required to present the information about the target object type.

The video generation system described in this specification can rapidly generate visually pleasing topical videos (e.g., in a matter of minutes) while requiring little or no manual user input, e.g., beyond providing the input video and specifying the target object type. In contrast, manually generating topical videos may be expensive and time consuming, e.g., requiring hours or days, and a significant amount of expertise. Therefore, the video generation system described in this specification enables more efficient allocation of time and resources by automating the task of generating topical videos.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
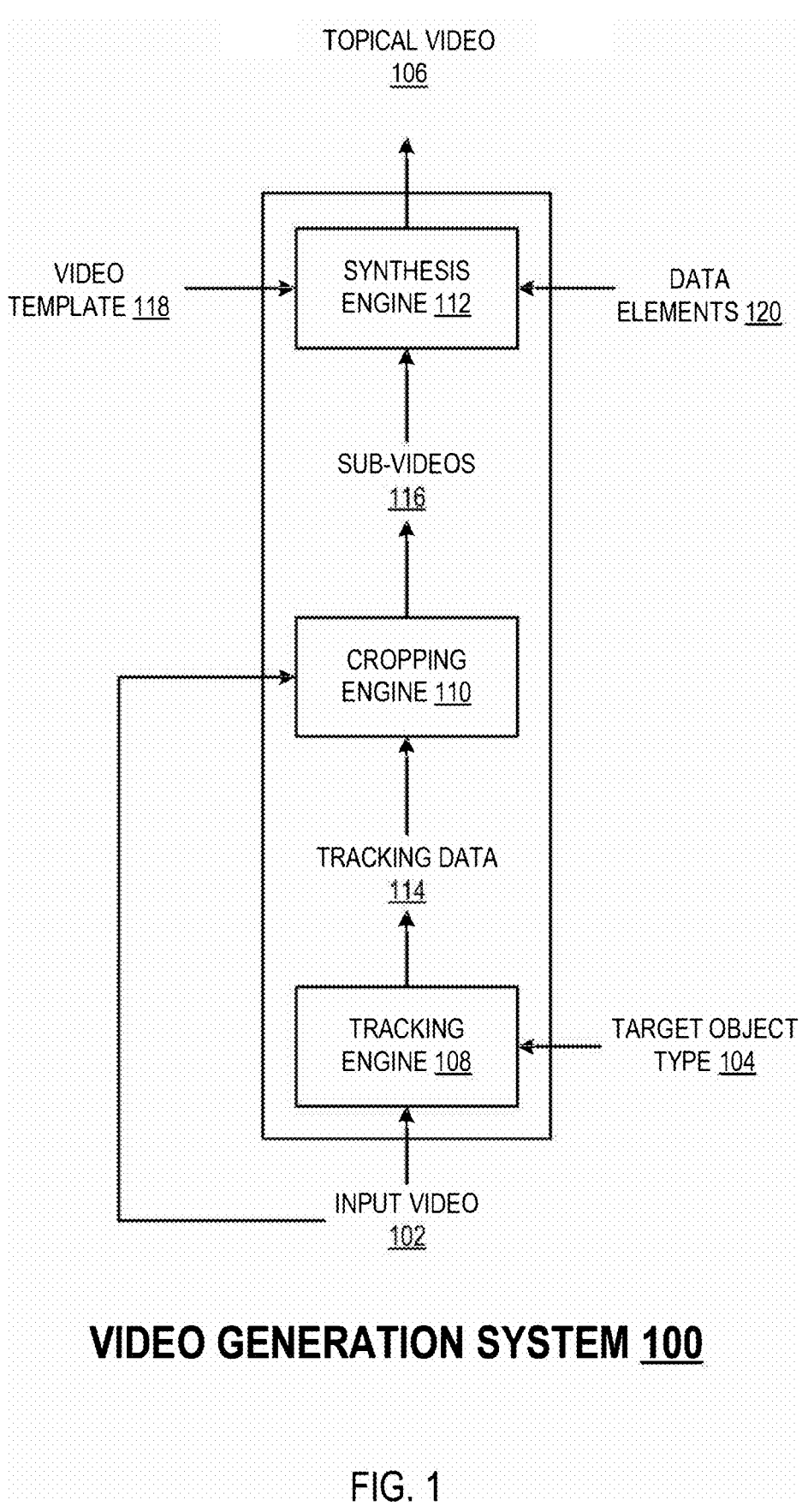
FIG. 1 shows an example video generation system.

FIG. 1 shows an example video generation system 100. The video generation system 100 is an example of a system implemented as computer programs on one or more computers in one or more locations in which the systems, components, and techniques described below are implemented.

The system 100 is configured to process: (i) an input video 102, and (ii) data identifying a "target" object type 104, to generate a topical video 106.

The input video 102 may include a sequence of video frames, where each video frame may be represented as an array of numerical values and be associated with a respective time point in the input video 102.

The target object type 104 may be a possible object type from a predefined set of possible object types. The set of possible object types may include any appropriate object types, e.g., food types (e.g., pizza, sandwich, etc.), beverage types (e.g., wine, beer, etc.), clothing types (e.g., dress, pants, shirt, blouse, etc.), accessory types (e.g., hat, handbag, glasses, etc.), electronics types (e.g., computer, smartphone, etc.), animal types (e.g., dog, cat, etc.), vehicle types (e.g., truck, sedan, sport utility vehicle (SUV), etc.), health/beauty types (e.g., lipstick, palette, nail polish, etc.), sporting goods types (e.g., football, soccer ball, tennis racket, swimming goggles, etc.), household appliance types (e.g., dishwasher, refrigerator, etc.), furniture types (e.g., chair, couch, etc.), and/or person types (e.g., man, woman, child, etc.). In some implementations, the set of possible object types may include fine-grained object types, e.g., that identify particular products, e.g., a vehicle of a particular make and model.

The system 100 processes the input video 102 and the target object type 104 to generate a topical video 106 that includes multiple "sub-videos" that are extracted (e.g., cropped) from the input video 102, where each sub-video shows (e.g., depicts) a respective object of the target object type 104. That is, the system 100 generates a topical video 106 that includes portions of the input video 102 which show objects of the target object type 104.

The system 100 can be used for any of a variety of applications. For example, the system 100 may be used to generate topical videos that are integrated into digital components that are transmitted for presentation with electronic documents at user devices, e.g., in blocks alongside search results or on third party websites, as will be described in more detail with reference to FIG. 3 and FIG. 4.

The system 100 includes a tracking engine 108, a cropping engine 110, and a synthesis engine 112, which will each be described in more detail next.

The tracking engine 108 is configured to process the input video 102 and the data identifying the target object type 104 to generate tracking data 114 that identifies, labels, and tracks visual locations of one or more instances of objects of the target object type 104 in the input video 102. For convenience, throughout this specification an object of the target object type 104 may be referred to as a "target object".

The tracking data 114 may include data defining one or more "target object trajectories", where each target object trajectory corresponds to a respective instance of a target object and tracks the position of the target object through each video frame in a sequence of multiple video frames. More specifically, a target object trajectory corresponding to a target object may specify the position of the target object in each video frame in a sequence of video frames, e.g., by specifying a respective bounding box corresponding to each video frame that encloses the target object in the video frame. A bounding box corresponding to a video frame may be defined, e.g., by the coordinates of the vertices of the bounding box, where the coordinates are expressed in the frame of reference of the video frame. As used throughout this specification, a "bounding box" in a video frame may specify a region of the video frame having any appropriate shape, e.g., a square shape, a rectangular shape, or a circular shape.

A bounding box specifying the position of a target object in a video frame may enclose less than all of the video frame, e.g., such that the bounding box excludes at least part of the video frame. (However, in some cases, a bounding box in a video frame may enclose the entirety of the video frame). Moreover, each target object trajectory may track the position of a corresponding target object through a sequence of video frames, which is a proper subset of the entire sequence of video frames of the input video.

The tracking engine 108 may use any appropriate object detection and tracking technique to generate the target object trajectories of the tracking data 114. As an example, the tracking engine 108 may use the object detection and tracking techniques described in: J. Henriques, R. Caseiro, P. Martins, J. Batista, "High-speed tracking with kernelized correlation filters," *IEEE Transactions on Pattern Analysis and Machine Intelligence*, vol. 37, no. 3, pp. 583-596 (2014). As another example, the tracking engine 108 may use the object detection and tracking techniques described in: N. Wojke, A. Bewley, D. Paulus, "Simple online and realtime tracking with a deep association metric," 2017 *IEEE International Conference on Image Processing (ICIP)*, pp. 3645-3649 (2017).

In a particular example, to generate the tracking data 114, the tracking engine 108 may process each video frame of the input video 102 using an object detection neural network that is configured to process a video frame to generate an object detection output. The object detection output may include: (i) one or more bounding boxes that each enclose a respective object depicted in the video frame, and (ii) for each bounding box, a label identifying a type of the object that is enclosed by the bounding box. The tracking engine 108 may maintain the bounding boxes that are labeled as enclosing objects of the target object type 104, while discarding (e.g., refraining from further processing of) any other bounding boxes. The tracking engine 108 may determine that a first bounding box in a first frame and a second bounding box in a second (e.g., subsequent) frame enclose the same object by determining that a similarity measure between the first bounding box and the second bounding box exceeds a threshold value. The similarity measure may be based on: (i) a visual similarity between the contents of the first bounding box and the second bounding box, and (ii) an overlap between the first bounding box and the second bounding box. In response to determining that the first bounding box and the second bounding box enclose the same object, the tracking engine 108 may determine that the first bounding box and the second bounding box are included in the same target object trajectory, e.g., thereby tracking the position of the object from the first frame to the second frame.

The cropping engine 110 is configured to process the input video 102 and the tracking data 114 to generate one or more sub-videos 116. More specifically, the cropping engine 110 may generate a respective sub-video 116 corresponding to each target object trajectory specified by the tracking data 114. As used throughout this specification, a "sub-video" refers to a video having a sequence of video frames, referred to as "sub-video frames", such that each sub-video frame of the sub-video is cropped from a respective video frame of the video 102. A sub-video frame of a sub-video 116 that is cropped from a corresponding video frame of the video 102 may include less than all of the corresponding video frame, e.g., such that the sub-video frame excludes at least a portion of the corresponding video frame (however, in some cases, a sub-video frame may include the entirety of a corresponding video frame of the video 102). In a particular example, a video frame may have dimensions a×b, where a is the width of the video frame (e.g., the number of pixels along the width spatial dimension of the video frame) and b is the height of the video frame (e.g., the number of pixels along the height spatial dimension of the video frame). In this example, the sub-video frame cropped from the video frame may have dimensions c×d, where c is less than a and d is less than b.

As used throughout this specification, the "dimensions" of a video frame (or a sub-video frame, or a bounding box in a video frame) may refer to data specifying: (i) the width of the video frame (e.g., the number of pixels along the width spatial dimension of the video frame), and (ii) the height of the video frame (e.g., the number of pixels along the height spatial dimension of the video frame).

The cropping engine 110 can generate a sub-video 116 corresponding to a target object trajectory of a target object in a variety of ways. A few example implementations of the cropping engine 110 are described in more detail next.

In one implementation, the cropping engine 110 may extract a respective sub-video frame from each video frame corresponding to the target object trajectory by extracting a portion of the video frame based on the position of the target object in the video frame. For example, the target object trajectory may specify a respective bounding box for each video frame that encloses the target object in the video frame, and the cropping engine 110 may extract the portion of each video frame that is enclosed by the bounding box for the video frame. That is, the cropping engine 110 may generate each sub-video frame by extracting the portion of the corresponding video frame that is enclosed by the bounding box specified by the target object trajectory as enclosing the target object in the video frame. In this example, the tracking engine 108 may be configured to generate target object trajectories that specify a bounding box having fixed dimensions (e.g., width and height) for each video frame, e.g., such that each of the extracted sub-video frames have the same dimensions.

In another implementation, to generate the sub-video 116 corresponding to the target object trajectory, the cropping engine 110 may determine the dimensions (e.g., width and height) and position (e.g., center) of a "super" bounding box. In particular, the cropping engine 110 may determine the dimensions and position of the super bounding box such that the target object is enclosed by the super bounding box in each video frame corresponding to the target object trajectory. For example, the target object trajectory may specify a respective bounding box for each video frame that encloses the target object in the video frame, and the cropping engine 110 may identify a super bounding box that encloses each of the bounding boxes specified by the target object trajectory.

That is, the cropping engine 110 may identify a super bounding box that encloses the union of the set of bounding boxes specified by the target object trajectory (while still enclosing less than all of each video frame). After determining the dimensions and position of the super bounding box, the cropping engine 110 may generate each sub-video frame by extracting the portion of a corresponding video frame that is enclosed by the super bounding box. Generating the sub-video 116 using a super bounding box that is the same for each video frame may improve the visual quality of the sub-video 116, e.g., by better preserving the cinematographic effects of the original video 102, e.g., panning and zooming.

In some cases, certain sub-videos 116 generated by the cropping engine 110 may be "temporally overlapping", e.g., such two or more of the sub-videos include respective sub-video frames that are extracted from the same video frame of the input video 102. This may occur, e.g., when the tracking engine 108 tracks two different instances of target objects through the same video frame in the video.

The synthesis engine 112 is configured to process the sub-videos 116 and a video template 118 to generate the topical video 106. The video template 118 defines a format for combining multiple sub-videos 116 into a composite video (e.g., the topical video 106) that includes each of the sub-videos. For example, the video template may define a partition of a two-dimensional (2-D) region (e.g., having a square or rectangular shape) into one or more sub-regions, referred to as "slots". The synthesis engine 112 generates the topical video 106 by assigning each sub-video 116 to a respective slot in the video template 118. The video template 118 may dynamically change over the duration of the topical video 106, e.g., slots may be removed, slots may be added, or the sizes of slots may be changed over the duration of the topical video.

Figure 2:
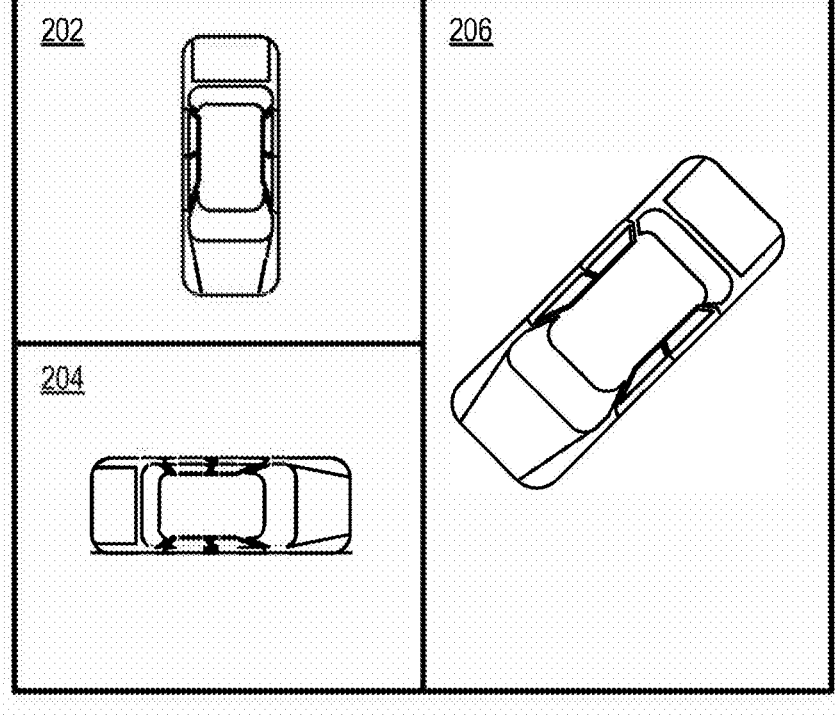
FIG. 2 shows an illustration of an example video template.

An example video template 200 is illustrated with reference to FIG. 2. The video template 200 includes three slots—i.e., slot 202, slot 204, and slot 206. The synthesis engine 112 may generate the topical video 106 by assigning a respective sub-video 116 to each slot of the video template 200, e.g., such that the sub-videos in each slot are shown concurrently. In the example illustrated with reference to FIG. 2, the target object type may be "vehicle", and each slot may be assigned a respective sub-video showing an instance of a vehicle.

In another example, the video template 118 may be defined such that each sub-video 116 is shown consecutively, e.g., one after another, rather than any sub-videos being shown concurrently.

As part of generating the topical video 106, the synthesis engine 112 may modify a sub-video 116 prior to assigning it to a slot in the video template 118. For example, the synthesis engine 112 may modify (e.g., reduce) the dimensions (e.g., width and/or the height) of the sub-video frames of a sub-video, e.g., to cause the dimensions of the sub-video to match the dimensions of a corresponding slot in the video template 118. As another example, the synthesis engine 112 may reduce the duration of a sub-video (e.g., by removing one or more sub-video frames of the sub-video) to cause the duration of the sub-video to match the duration of a slot. The duration of a slot may refer to the length of time the slot is included in the template, e.g., before being removed from the template.

The synthesis engine 112 may determine the assignment of the sub-videos 116 to the slots of the video template 118 in any of a variety of ways. In one example, the synthesis engine 112 may randomly assign sub-videos 116 to respective slots of the video template 118. In another example, the synthesis engine 112 may assign each sub-video 116 to a corresponding slot having dimensions that are most similar (e.g., from amongst all the slots) to the dimensions of the sub-video 116, e.g., to minimize the modifications applied to the sub-videos to cause them to fit their assigned slots.

In some cases, prior to assigning the sub-videos 116 to slots in the video template 118, the synthesis engine 112 may determine a respective score for each sub-video, where the score for a sub-video characterizes a quality of the sub-video. The synthesis engine 112 may determine the score for each sub-video based on one or more criteria, e.g., the sharpness of the sub-video and the amount of motion in the sub-video. The sharpness of a sub-video may be computed using any appropriate sharpness measure, e.g., by computing the maximum pixel intensity value in the sub-video frames after convolving the sub-video frames with a Laplacian kernel. The amount of motion in the sub-video may be computed, e.g., by computing the average value of a set of optical flow frames corresponding to the sub-video frames. The synthesis engine 112 may generate the overall score for a sub-video based on, e.g., a linear combination of a sharpness score characterizing the sharpness of the sub-video and a motion score characterizing the amount of motion in the sub-video. The synthesis engine 112 may generate higher scores for sub-videos that are sharper and include more motion.

The synthesis engine 112 may use the scores for the sub-videos 116 to determine which sub-videos 116 should be included in the topical video 106. For example, the synthesis engine 112 may determine that only a proper subset of the sub-videos 116 having the highest scores should be included in the topical video 106. As another example, the synthesis engine 112 may determine that any sub-video 116 having a score that fails to satisfy a predefined threshold value (e.g., by exceeding the threshold value) should not be included in the topical video 106.

In some implementations, the system 100 may receive one or more data elements 120 to be included in the topical video 106, e.g., other than sub-videos 116 extracted from the input video 102. The data elements 120 may include, e.g., images or portions of text. The synthesis engine 112 may include the data elements 120 in the topical video 106 by assigning the data elements to respective slots of the video template 118.

The topical videos 106 generated by the video generation system 100 can be used in any of a variety of applications. A few example applications are described in more detail next.

In one example, topical videos 106 generated by the video generation system 100 may be included in digital components that are provided in response to digital component requests, e.g., as described in more detail with reference to FIG. 3 and FIG. 4.

In another example, the video generation system 100 may process: (i) input videos that are generated, e.g., by one or more surveillance cameras (security cameras), and (ii) target object types 104 that are specified by a user, to generate corresponding topical videos 106. The input videos generated by the surveillance cameras may be lengthy, e.g., having a duration of hours or days. The video generation system 100 may enable rapid processing of videos generated by surveillance cameras to generate topical videos showing objects of interest to a user, e.g., pets, people, or vehicles. A surveillance camera may refer to a camera that is placed at a given position (e.g., beside the front door of a home) and continuously captures video of a region in the vicinity of the given position.

In another example, the video generation system 100 may process: (i) input videos that are generated by a user device, e.g., a video camera of a smartphone, and (ii) target object types 104 that are specified by a user, to generate corresponding topical videos 106.

Figure 3:
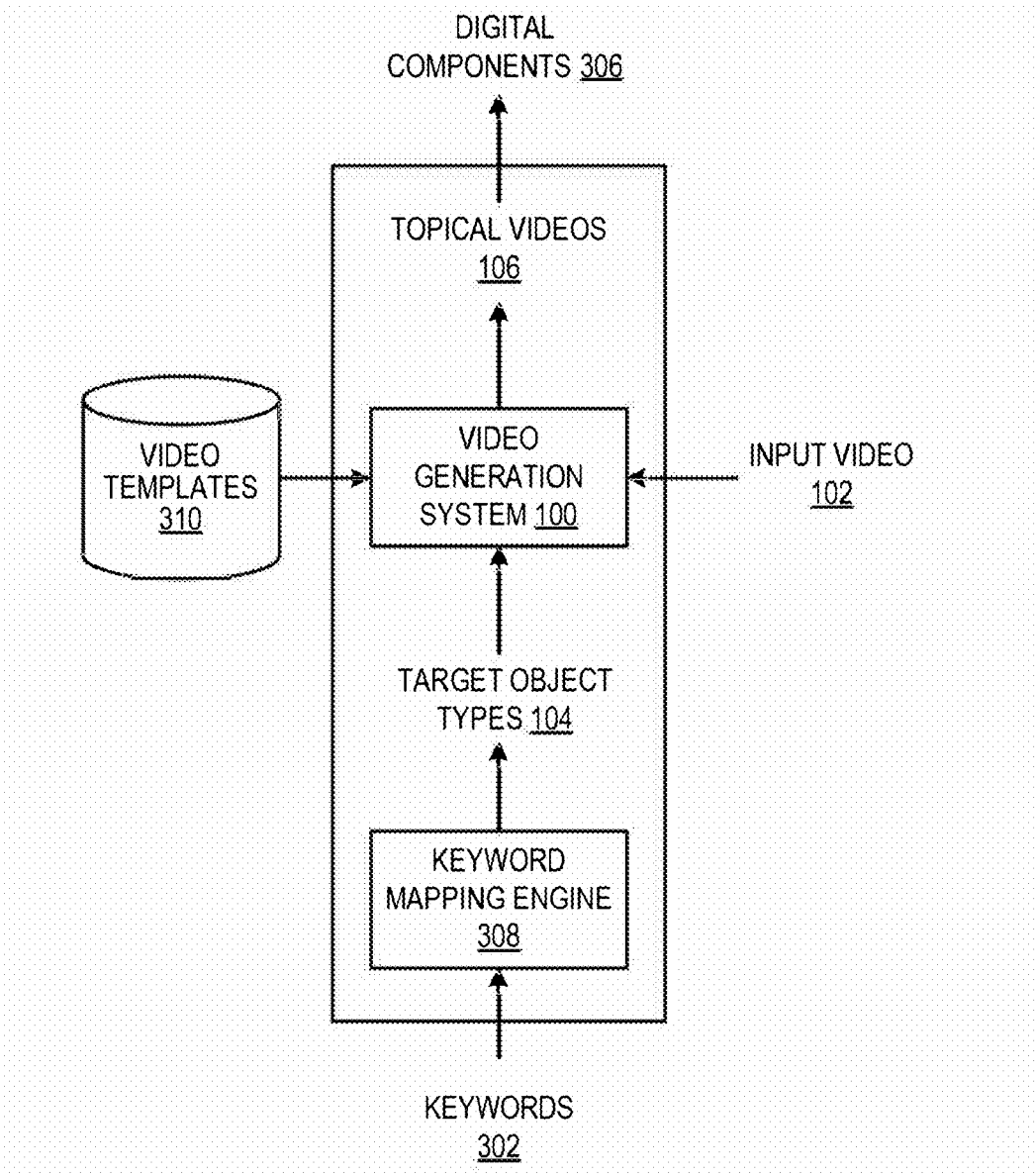
FIG. 3 shows an example digital component generation system.

FIG. 3 shows an example digital component generation system 300. The digital component generation system 300 is an example of a system implemented as computer programs on one or more computers in one or more locations in which the systems, components, and techniques described below are implemented.

The digital component generation system 300 is configured to receive one or more keywords 302 and an input video 102 from a content provider, and to generate one or more digital components 306 that include topical videos 106 relevant to respective keywords 302. The content provider may be, e.g., a publisher, advertiser, or other content source.

As used throughout this specification, the phrase digital component refers to a discrete unit of digital content or digital information that can include one or more of, e.g., images, video clips (e.g., topical videos), audio clips, multimedia clips, text segments, or uniform resource locators (URLs). A digital component can be electronically stored in a physical memory device as a single file or in a collection of files, and digital components can take the form of video files, audio files, multimedia files, image files, or text files and include streaming video, streaming audio, social network posts, blog posts, and/or advertising information, such that an advertisement is a type of digital component. A digital component can be enhanced with data from one or more sources (e.g., weather information, real time event information, or other information obtained from other sources).

The system 300 includes a keyword mapping engine 308 and a video generation system 100 (as described with reference to FIG. 1). In addition, the system 300 may be associated with a user interface (e.g., a graphical user interface, or any other appropriate sort of user interface) that enables the content provider to interact with the system 300, as will be described in more detail below.

The keyword mapping engine 308 is configured to map each keyword 302 to a corresponding target object type 104 from a set of possible object types, e.g., in accordance with a predefined mapping from keywords to possible object types. For example, the keyword mapping engine 308 may map the each of the keywords "spectacles", "specs", "reading glasses", "sunglasses", and "eyeglasses" to the possible object type of "glasses". The set of possible object types may be the set of object types that the tracking engine of the video generation system 100 is trained (or otherwise configured) to identify and track in videos. In some implementations, the system 300 may provide an indication of the target object types 104 corresponding to the keywords 302 to the content provider, and request that the content provider "approve" (e.g., perform an action to accept) each of the target object types 104.

The system 300 may use the video generation system 100 to generate one or more respective topical videos 106 corresponding to each target object type 104, e.g., by processing the target object type 104 and the input video 102 using the video generation system 100. The video generation system 100 may generate multiple topical videos 106 corresponding to a single target object type 104, e.g., by generating topical videos 106 using different video templates from a set of possible video templates 310, by generating topical videos 106 using different combinations of sub-videos extracted from the input video, by generating topical videos 106 where the sub-videos of the input video 102 are assigned to different combinations of slots in a video template, or by overlaying different audio soundtracks over the topical videos 106. The system 300 may enable the content provider to specify (e.g., through the user interface) various factors controlling the generation of the topical videos 106, e.g., which video templates 310 and/or audio soundtracks should be used by the video generation system 100 to generate the topical videos 106.

In addition to the keywords 302 and the input video 102, the content provider may also provide one or more other data elements (e.g., images or portions of text) to the system 300 to be included in the topical videos 106. The video generation system 100 may include the provided data elements in the topical videos, e.g., as described with reference to FIG. 1.

The system 300 may enable the content provider to select one or more of the topical videos 106 to be included in respective digital components 306. Each digital component 306 may include a topical video 106 and other data elements (e.g., videos, images, portions of text, URLs) that may be provided by the content provider.

The content provider may provide the digital components 306 generated by the system 300 to a digital component distribution system, e.g., the digital component distribution system 410 described with reference to FIG. 4. The digital component distribution system can transmit the digital components 306 in response to requests for digital components to be presented with electronic documents at user devices, e.g., in blocks alongside search results or on third party websites.

In a particular example illustrating the utility of the system 300, a content provider may provide the system 300 with an input video 102 that includes several hours of footage of a fashion show, and the keyword 302 "handbag". The system 300 may process the input video 102 and the keyword 302 to generate a corresponding set of topical videos 106, each of which include multiple sub-videos of the input video that show instances of handbags, where the sub-videos are automatically edited into visually pleasing video templates, and omit portions of the input video, such that the populated video templates have a shorter duration (e.g., 30 second, 1 minute, 2 minutes, or another duration) than the duration of the input video 102 (e.g., the several hours of footage of the fashion show). The content provider may then select one or more of the topical videos 106 to be included in digital components that are provided to the digital component distribution system.

Figure 4:
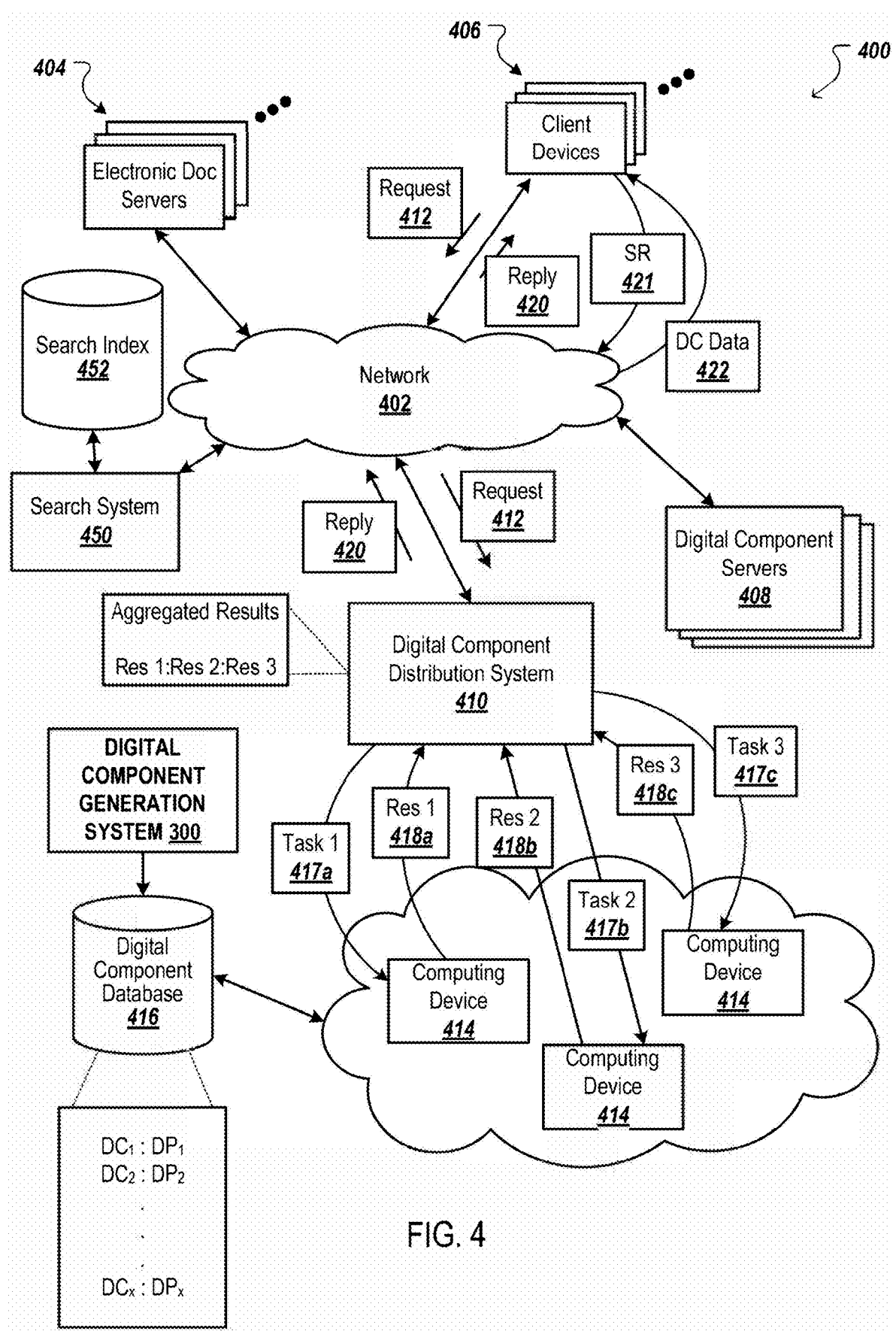
FIG. 4 is a block diagram of an example environment in which a digital component distribution system transmits digital components from a digital component database for presentation with electronic documents.

FIG. 4 is a block diagram of an example environment 400 in which a digital component distribution system 410 transmits digital components from a digital component database 416 for presentation with electronic documents. A content provider may generate digital components using the digital component generation system 300 (described with reference to FIG. 3) and provide the generated digital components to the digital component distribution system 410.

The example environment 400 includes a network 402, such as a local area network (LAN), a wide area network (WAN), the Internet, or a combination thereof. The network 402 connects electronic document servers 404, client devices 406, digital component servers 408, and the digital component distribution system 410 (also referred to as the "distribution system" 410). The example environment 400 may include many different electronic document servers 404, client devices 406, and digital component servers 408.

A client device 406 is an electronic device that is capable of requesting and receiving resources over the network 402. Example client devices 406 include personal computers, mobile communication devices (e.g., mobile phones), and other devices that can send and receive data over the network 402. A client device 406 typically includes a user application, such as a web browser, to facilitate the sending and receiving of data over the network 402, but native applications executed by the client device 406 can also facilitate the sending and receiving of data over the network 402.

An electronic document is data that presents a set of content at a client device 406. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 406 by electronic document servers 404 ("Electronic Doc Servers"). For example, the electronic document servers 404 can include servers that host publisher websites. In this example, the client device 406 can initiate a request for a given publisher webpage, and the electronic server 404 that hosts the given publisher webpage can respond to the request by sending machine executable instructions that initiate presentation of the given webpage at the client device 406.

In another example, the electronic document servers 404 can include app servers from which client devices 406 can download apps. In this example, the client device 406 can download files required to install an app at the client device 406, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 406 to request content from the data source when the given electronic document is processed (e.g., rendered or executed) by a client device 406. The client device 406 integrates the content obtained from the data source into the given electronic document to create a composite electronic document including the content obtained from the data source.

In some situations, a given electronic document can include one or more digital component tags or digital component scripts that reference the digital component distribution system 410. In these situations, the digital component tags or digital component scripts are executed by the client device 406 when the given electronic document is processed by the client device 406. Execution of the digital component tags or digital component scripts configures the client device 406 to generate a request for one or more digital components 412 (referred to as a "component request"), which is transmitted over the network 402 to the digital component distribution system 410. For example, a digital component tag or digital component script can enable the client device 406 to generate a packetized data request including a header and payload data. The component request

412 can include event data specifying features such as a name (or network location) of a server from which the digital component is being requested, a name (or network location) of the requesting device (e.g., the client device 406), and/or information that the digital component distribution system 410 can use to select one or more digital components provided in response to the request. The component request 412 is transmitted, by the client device 406, over the network 402 (e.g., a telecommunications network) to a server of the digital component distribution system 410.

The component request 412 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 410. Similarly, event data specifying keywords associated with the electronic document ("document keywords") or entities (e.g., people, places, or things) that are referenced by the electronic document can also be included in the component request 412 (e.g., as payload data) and provided to the digital component distribution system 410 to facilitate identification of digital components that are eligible for presentation with the electronic document. The event data can also include a search query that was submitted from the client device 406 to obtain a search results page, and/or data specifying search results and/or textual, audible, or other visual content that is included in the search results.

Component requests 412 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 412 can be transmitted, for example, over a packetized network, and the component requests 412 themselves can be formatted as packetized data having a header and payload data. The header can specify a destination of the packet and the payload data can include any of the information discussed above.

The component distribution system 410 chooses digital components that will be presented with the given electronic document in response to receiving the component request 412 and/or using information included in the component request 412. In some implementations, a digital component is selected (using the techniques described herein) in less than a second to avoid errors that could be caused by delayed selection of the digital component. For example, delays in providing digital components in response to a component request 412 can result in page load errors at the client device 406 or cause portions of the electronic document to remain unpopulated even after other portions of the electronic document are presented at the client device 406. Also, as the delay in providing the digital component to the client device 406 increases, it is more likely that the electronic document will no longer be presented at the client device 406 when the digital component is delivered to the client device 406, thereby negatively impacting a user's experience with the electronic document. Further, delays in providing the digital component can result in a failed delivery of the digital component, for example, if the electronic document is no longer presented at the client device 406 when the digital component is provided.

In some implementations, the digital component distribution system 410 is implemented in a distributed computing system that includes, for example, a server and a set of multiple computing devices 414 that are interconnected and identify and distribute digital components in response to requests 412. The set of multiple computing devices 414 operate together to identify a set of digital components that are eligible to be presented in the electronic document from a corpus of millions of available digital components (DC1-x). The millions of available digital components can be indexed, for example, in a digital component database 416. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 412) in order for the digital component to be eligible for presentation. In other words, the distribution parameters are used to trigger distribution (e.g., transmission) of the digital components over the network 402. The distribution parameters can also require that the component request 412 include information specifying a particular geographic region (e.g., country or state) and/or information specifying that the component request 412 originated at a particular type of client device (e.g., mobile device or tablet device) in order for the digital component to be eligible for presentation.

The distribution parameters can also specify an eligibility value (e.g., ranking score, bid, or some other specified value) that is used for evaluating the eligibility of the digital component for distribution/transmission (e.g., among other available digital components), for example, by the component evaluation process. In some situations, the eligibility value can specify a maximum amount of compensation that a provider of the digital component is willing to submit in response to the transmission of the digital component (e.g., for each instance of specific events attributed to the presentation of the digital component, such as user interaction with the digital component).

The identification of the eligible digital component can be segmented into multiple tasks 417a-417c that are then assigned among computing devices within the set of multiple computing devices 414. For example, different computing devices in the set 414 can each analyze a different portion of the digital component database 416 to identify various digital components having distribution parameters that match information included in the component request 412. In some implementations, each given computing device in the set 414 can analyze a different data dimension (or set of dimensions) and pass (e.g., transmit) results (Res 1-Res 3) 418a-418c of the analysis back to the digital component distribution system 410. For example, the results 418a-418c provided by each of the computing devices in the set 414 may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 410 aggregates the results 418a-418c received from the set of multiple computing devices 414 and uses information associated with the aggregated results to: (i) select one or more digital components that will be provided in response to the request 412, and (ii) determine transmission requirements for the one or more digital components. For example, the digital component distribution system 410 can select a set of winning digital components (one or more digital components) based on the outcome of one or more component evaluation processes. In turn, the digital component distribution system 410 can generate and transmit, over the network 402, reply data 420 (e.g., digital data representing a reply) that enables the client device 406 to integrate the set of winning digital components into the given electronic document, such that the set of winning digital components and the content of the electronic document are presented together at a display of the client device 406.

In some implementations, the client device 406 executes instructions included in the reply data 420, which configures and enables the client device 406 to obtain the set of winning digital components from one or more digital component servers. For example, the instructions in the reply data 420 can include a network location (e.g., a Uniform Resource Locator (URL)) and a script that causes the client device 406 to transmit a server request (SR) 421 to the digital component server 408 to obtain a given winning digital component from the digital component server 408. In response to the request, the digital component server 408 will identify the given winning digital component specified in the server request 421 (e.g., within a database storing multiple digital components) and transmit, to the client device 406, digital component data (DC Data) 422 that presents the given winning digital component in the electronic document at the client device 406.

To facilitate searching of electronic documents, the environment 400 can include a search system 450 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 452 (e.g., hardware memory device(s)). Data that are associated with an electronic document is data that represents content included in the electronic document and/or metadata for the electronic document.

Client devices 406 can submit search queries to the search system 450 over the network 402. In response, the search system 450 accesses the search index 452 to identify electronic documents that are relevant to the search query. The search system 450 identifies the electronic documents in the form of search results and returns the search results to the client device 406 in a search results page. A search result is data generated by the search system 450 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 406. In some situations, the search system 450 can be part of, or interact with, an application store (or an online portal) from which applications can be downloaded for install at a client device 406 in order to present information about downloadable applications that are relevant to a submitted search query. Like other electronic documents, search results pages can include one or more slots in which digital components (e.g., advertisements, video clips, audio clips, images, or other digital components) can be presented.

To select a digital component to be transmitted in response to a component request, the distribution system 410 may identify a set of digital components that are eligible to be transmitted in response to the component request. The distribution system 410 may then select one or more of the eligible digital components to be transmitted through, e.g., an auction procedure. In some implementations, the distribution system 410 performs an auction procedure by ranking the eligible digital components in accordance with their respective eligibility values, and selecting one or more highest-ranked digital components to be transmitted in response to the component request.

Figure 5:
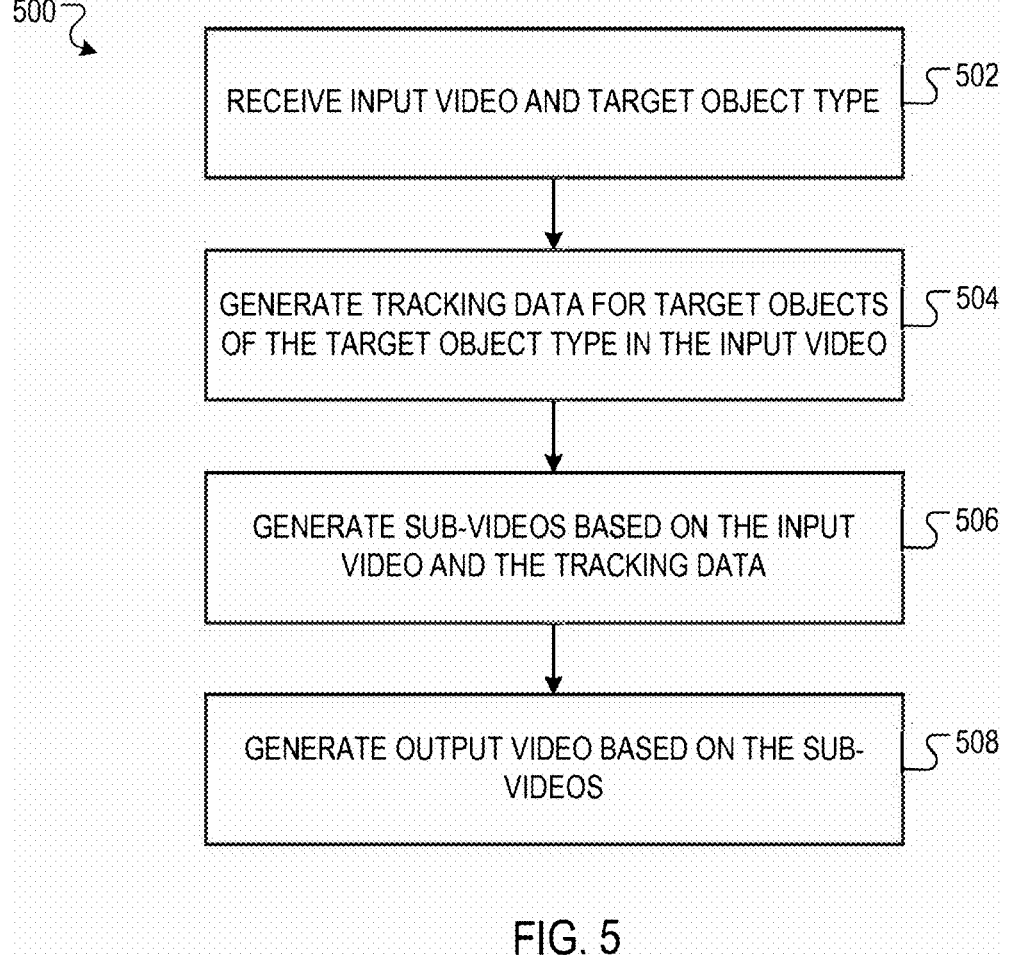
FIG. 5 is a flow diagram of an example process for generating a topical video.

FIG. 5 is a flow diagram of an example process 500 for generating a topical video. For convenience, the process 500 will be described as being performed by a system of one or more computers located in one or more locations. For example, a video generation system, e.g., the video generation system 100 of FIG. 1, appropriately programmed in accordance with this specification, can perform the process 500.

The system receives: (i) an input video including a sequence of video frames, and (ii) data indicating a target object type (502). For example, the system may receive data specifying a keyword (e.g., "sunglasses"), and then map the received keyword to a corresponding target object type (e.g., "glasses") in accordance with a mapping from keywords to a predefined set of possible target object types. Optionally, the system may also receive one or more additional data elements, e.g., images, portions of text, or both.

The system processes the input video to generate tracking data that identifies and tracks visual locations of one or more instances of target objects of the target object type in the input video (504). For example, for each instance of a target object of the target object type in the input video, the system may determine a respective bounding box that encloses the instance of the target object in each of multiple video frames of the input video. The system may use any appropriate object detection and tracking technique to generate the tracking data, e.g., as described with reference to FIG. 1.

The system generates multiple sub-videos based on the input video and the tracking data (506). For each sub-video, the system may generate a respective sequence of sub-video frames that are each cropped from a respective video frame of the input video to include (i) less than all content of the respective video frame and (ii) a respective instance of a given target object from among the identified target objects of the target object type. In some implementations, instead of each of the sub-video frames being cropped to include less than all content of the respective video frame, at least one of the sub-video frames is cropped from at least one respective video frame of the input video to include less than all content of the at least one respective video frame. In such implementations, one or more of the sub-video frames may comprise all content of the respective video frames, for example because a target object occupies all of the respective video frames or most of the respective video frames in those respective video frames. A sub-video frame may comprise a subset of all content of the respective video frame, with the subset being less than or equal to all content of the respective video frame. In some implementations, the system may generate the sequence of sub-video frames of a sub-video corresponding to an instance of a given target object by cropping a respective bounding box that encloses the instance of the given target object from each of multiple video frames of the input video. The bounding boxes enclosing instance of the given target object may be specified by the tracking data. In some implementations, to generate the sequence of sub-video frames of a sub-video corresponding to an instance of a given target object, the system may determine, based on the tracking data, a same bounding box that encloses the instance of the given target object in each of multiple video frames of the input video. The system may then generate the sequence of sub-video frames of the sub-video by cropping the same bounding box from each of the multiple video frames of the input video.

In some cases, certain sub-videos may be "temporally overlapping", e.g., such two or more of the sub-videos include respective sub-video frames that are extracted from the same video frame of the input video. This may occur, e.g., when the system tracks two different instances of target objects through the same video frame in the input video.

The system generates an output video that includes the sub-videos (508). For example, to generate the output video, the system may assign each sub-video to a respective slot in a video template that defines a format for combining the sub-videos. As part of generating the output video, the system may determine a respective score for each sub video (e.g., based on the sharpness of the sub-video), and select a proper subset of the sub-videos for inclusion in the output video (e.g., a predefined number of sub-videos with the highest scores). In some cases, the output video may concurrently show at least two of the sub-videos, while in other cases, the output video may show each of the sub-videos consecutively, e.g., one after another. As part of generating the output video, the system may assign each of one or more additional data elements (e.g., textual or image data elements, as described with reference to 502) to a respective slot in the video template.

The output video generated by the system may be included in a digital component that is provided in response to a digital component request and subsequently presented alongside search results or on a third-party webpage.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more computers, the method comprising:
   receiving an input video comprising a sequence of video frames;

processing the input video to generate tracking data that identifies and tracks visual locations of one or more instances of at least one target object in the input video;
   generating a set of multiple sub-videos based on the input video and the tracking data;
   determining a respective score for each sub-video in the set of multiple sub-videos that characterizes a quality of the sub-video;
   selecting a proper subset of the set of multiple sub-videos based on the scores;
   generating an output video that comprises the proper subset of sub-videos; and
   causing presentation of the output video at a user interface of a computing device.

2. The method of claim 1, wherein generating the set of multiple sub-videos based on the input video and the tracking data comprises, for each sub-video:
   generating a respective sequence of sub-video frames that are each extracted from a respective video frame of the input video.

3. The method of claim 2, wherein for each sub-video, each of the sub-video frames includes a depiction of the at least one target object and excludes at least some content of the respective video frame that is outside of a bounding box that encloses the target object in each of the sub-video frames.

4. The method of claim 1, wherein each of the sub-videos has a duration that is shorter than the input video.

5. The method of claim 1, wherein processing the input video to generate tracking data that identifies and tracks visual locations of one or more instances of at least one target object in the input video comprises:
   processing each video frame in the sequence of video frames of the input video using an object detection neural network to generate, for each of a plurality of the video frames, a respective object detection output that defines one or more bounding boxes that each enclose a respective object in the video frame; and
   generating the tracking data using the object detection outputs for the video frames in the sequence of video frames of the input video.

6. The method of claim 5, wherein generating the tracking data using the object detection outputs for the video frames in the sequence of video frames in the input video comprises:
   determining a similarity measure between a first bounding box in a first video frame and a second bounding box in a second video frame satisfies a threshold; and
   in response, determining that the first bounding box and the second bounding box are included in a same target object trajectory that tracks a position of a target object from the first video frame to the second video frame.

7. The method of claim 6, wherein determining the similarity measure between the first bounding box in the first video frame and the second bounding box in the second video frame comprises:
   determining an overlap between the first bounding and the second bounding box; and
   determining the similarity measure based at least in part on the overlap between the first bounding box and the second bounding box.

8. The method of claim 6, wherein determining the similarity measure between the first bounding box in the first video frame and the second bounding box in the second video frame comprises:

determining a visual similarity between respective video frame content enclosed by the first bounding box and the second bounding box; and determining the similarity measure based at least in part on the visual similarity between the respective video frame content enclosed by the first bounding box and the second bounding box.

9. The method of claim 1, wherein for each sub-video in the set of multiple sub-videos, determining the score for the sub-video comprises:

determining the score for the sub-video based at least in part on an amount of motion in the sub-video.

10. The method of claim 1, wherein for each sub-video in the set of multiple sub-videos, determining the score for the sub-video comprises:

determining the score for the sub-video based at least in part on a sharpness of the sub-video.

11. The method of claim 1, wherein causing presentation of the output video at the user interface of the computing device comprises:

receiving a request for a digital component;

determining that a digital component that includes the output video is responsive to the request; and providing the digital component that includes the output video in response to the request to be presented alongside search results or on a third-party webpage.

12. A system comprising:

one or more computers; and one or more storage devices communicatively coupled to the one or more computers, wherein the one or more storage devices store instructions that, when executed by the one or more computers, cause the one or more computers to perform operations comprising:

receiving an input video comprising a sequence of video frames;

processing the input video to generate tracking data that identifies and tracks visual locations of one or more instances of at least one target object in the input video;

generating a set of multiple sub-videos based on the input video and the tracking data;

determining a respective score for each sub-video in the set of multiple sub-videos that characterizes a quality of the sub-video;

selecting a proper subset of the set of multiple sub-videos based on the scores;

generating an output video that comprises the proper subset of sub-videos; and causing presentation of the output video at a user interface of a computing device.

13. One or more non-transitory computer storage media storing instructions that when executed by one or more computers cause the one or more computers to perform operations comprising:

receiving an input video comprising a sequence of video frames;

processing the input video to generate tracking data that identifies and tracks visual locations of one or more instances of at least one target object in the input video;

generating a set of multiple sub-videos based on the input video and the tracking data;

determining a respective score for each sub-video in the set of multiple sub-videos that characterizes a quality of the sub-video;

selecting a proper subset of the set of multiple sub-videos based on the scores;

generating an output video that comprises the proper subset of sub-videos; and causing presentation of the output video at a user interface of a computing device.

14. The one or more non-transitory computer storage media of claim 13, wherein generating the set of multiple sub-videos based on the input video and the tracking data comprises, for each sub-video:

generating a respective sequence of sub-video frames that are each extracted from a respective video frame of the input video.

15. The one or more non-transitory computer storage media of claim 14, wherein for each sub-video, each of the sub-video frames includes a depiction of the at least one target object and excludes at least some content of the respective video frame that is outside of a bounding box that encloses the target object in each of the sub-video frames.

16. The one or more non-transitory computer storage media of claim 13, wherein each of the sub-videos has a duration that is shorter than the input video.

17. The one or more non-transitory computer storage media of claim 13, wherein processing the input video to generate tracking data that identifies and tracks visual locations of one or more instances of at least one target object in the input video comprises:

processing each video frame in the sequence of video frames of the input video using an object detection neural network to generate, for each of a plurality of the video frames, a respective object detection output that defines one or more bounding boxes that each enclose a respective object in the video frame; and generating the tracking data using the object detection outputs for the video frames in the sequence of video frames of the input video.

18. The one or more non-transitory computer storage media of claim 17, wherein generating the tracking data using the object detection outputs for the video frames in the sequence of video frames in the input video comprises:

determining a similarity measure between a first bounding box in a first video frame and a second bounding box in a second video frame satisfies a threshold; and in response, determining that the first bounding box and the second bounding box are included in a same target object trajectory that tracks a position of a target object from the first video frame to the second video frame.

19. The one or more non-transitory computer storage media of claim 18, wherein determining the similarity measure between the first bounding box in the first video frame and the second bounding box in the second video frame comprises:

determining an overlap between the first bounding and the second bounding box; and determining the similarity measure based at least in part on the overlap between the first bounding box and the second bounding box.

20. The one or more non-transitory computer storage media of claim 18, wherein determining the similarity measure between the first bounding box in the first video frame and the second bounding box in the second video frame comprises:

determining a visual similarity between respective video frame content enclosed by the first bounding box and the second bounding box; and determining the similarity measure based at least in part on the visual similarity between the respective video frame content enclosed by the first bounding box and the second bounding box.

* * * * *